June 30, 1942.  C. GOODALL  2,288,238
GRASS OR HAY LIFTER
Filed Nov. 12, 1940
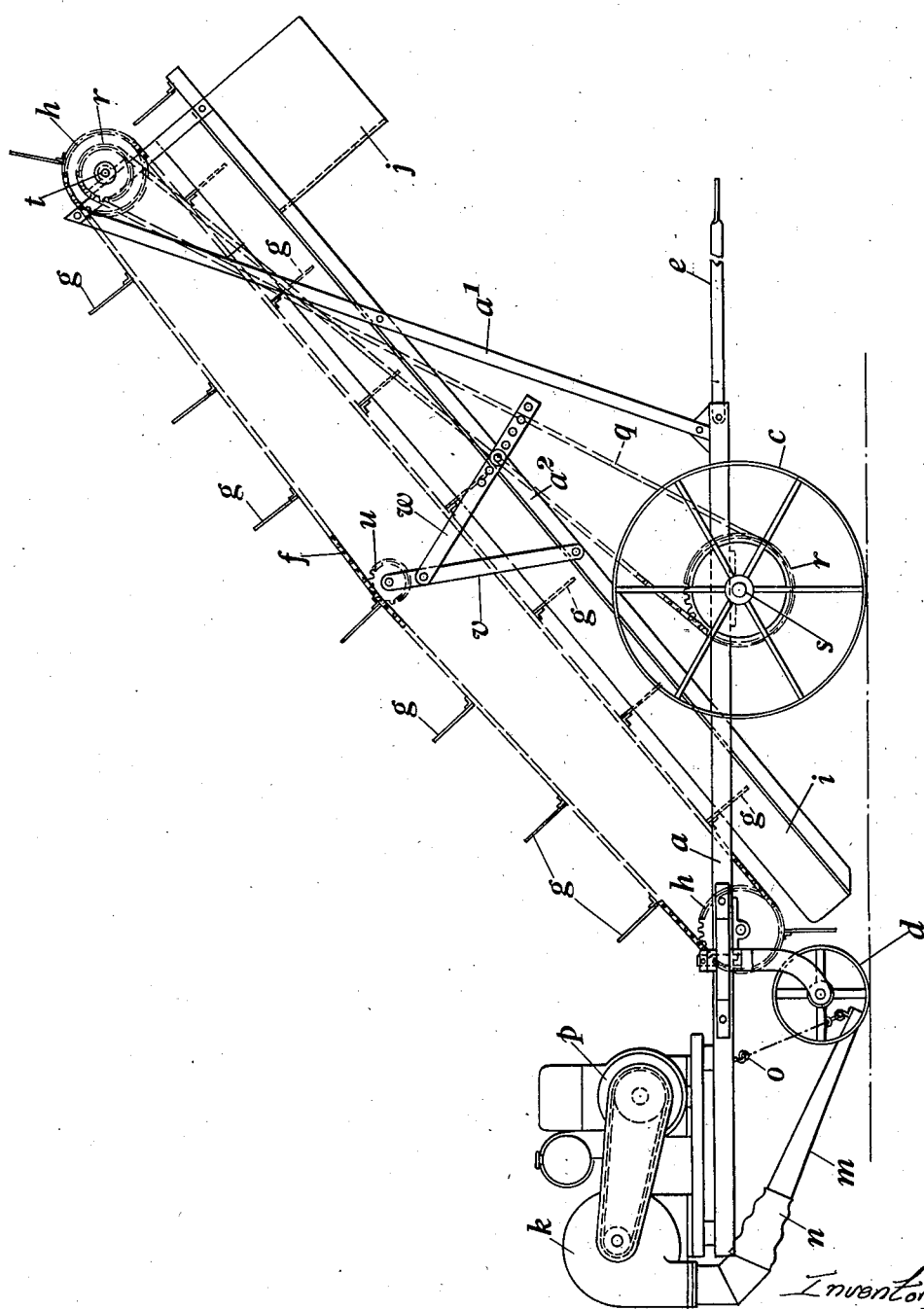
Inventor,
C. Goodall
By: Glascock Downing & Seebold
Attys.

Patented June 30, 1942

2,288,238

UNITED STATES PATENT OFFICE 2,288,238

GRASS OR HAY LIFTER

Charles Goodall, Hatton, England

Application November 12, 1940, Serial No. 365,361
In Great Britain January 30, 1940

2 Claims. (Cl. 56—345)

This invention has for its object to provide an improved mechanical lifter for raising cut grass or hay from the ground and delivering it into a cart.

The invention comprises the combination of a framework provided with ground wheels, an endless conveyor provided with tines and carried by appropriate pulleys, a blower adapted to deliver a blast of air under the grass or hay for engaging it with the conveyor tines, and means for driving the blower and conveyor.

The accompanying drawing is a side elevation of a grass or hay lifter constructed in accordance with the invention.

In carrying the invention into effect as shown, I employ a framework constructed from steel or wooden members and consisting of a horizontal portion $a$, an upwardly extending inclined portion $a^1$ secured to one end of the horizontal portion, and another inclined portion $a^2$ extending across and secured to both of the other portions. The horizontal portion $a$ is provided with two pairs of ground wheels $c$, $d$ and has pivotally attached to it at the end adjacent to the upwardly extending frame portion $a^1$ a draw-bar $e$ whereby the wheeled framework can be towed by a cart. On the framework is mounted a conveyor $f$ consisting of an endless chain or belt provided with tines $g$, the conveyor being carried by a pair of sprocket wheels $h$ or pulleys situated one at or near the upper end of the inclined frame portion $a^1$ and the other on the horizontal frame portion $a$ at a position remote from the draw-bar $e$. The conveyor $f$ is suitably inclined to the vertical and at its under side is arranged on the framework portion $a^2$ an inclined trough $i$ along which the grass or hay can be moved by the tines $g$ from the ground to the upper end of the trough where the grass or hay can be discharged into the towing cart above mentioned through a chute $j$ depending from the upper end of the trough, the cart being either self propelled or towed by a tractor.

Adjacent to the lower end of the conveyor $f$ there is mounted on the horizontal portion $a$ of the framework a rotary blower $k$ of any convenient form which is provided with a nozzle $m$ adapted to direct a blast of air from the blower beneath the cut grass or hay lying on the ground in the vicinity of the lower end of the conveyor, this blast serving to raise or disturb the grass or hay sufficiently to ensure its effective engagement with the lower tines $g$ of the conveyor. Preferably the nozzle $m$ is connected to the blower $k$ by a flexible or articulated duct as $n$ which permits the nozzle to be adjusted relatively to the ground, or to be raised clear of the ground when the wheeled framework $a$, $a^1$, $a^2$ is being moved from one field to another, the outer end of the nozzle being adjustably connected by, for example, a chain $o$ to the horizontal portion $a$ of the framework. The blower $k$ may be driven by a small engine $p$ carried on the horizontal portion $a$ of the framework. The engine $p$ may also serve to drive the conveyor $f$, but preferably and as shown the latter is driven from the ground wheels $c$ by the engagement of an endless chain $q$ with sprocket wheels $r$ mounted respectively on the axle $s$ of the ground wheels $c$ and the spindle $t$ of the upper sprocket wheel $h$ of the conveyor.

Any convenient means may be provided for adjusting the tension of the conveyor $f$. Thus the side of the conveyor $f$ remote from the trough $i$ may be engaged at a position intermediate its ends by a freely rotatable gear or other wheel $u$ on one end of an arm $v$ which at its other end is pivoted to the frame portion $a^2$, and which at a position near the gear or other wheel is pivoted to one end of an adjusting link $w$, the latter being adjustably connected to the said frame portion.

The invention is not limited to the example above described as subordinate details may be varied to suit different requirements.

By this invention I am able to effect the collecting of cut grass or hay from the ground in a more convenient and satisfactory manner than with an ordinary mechanical lifter.

Having thus described my invention what I claim as new and desire to secure by Letters Patent is:

1. A grass or hay lifter comprising in combination a framework, a mechanical conveyor mounted on the framework and adapted to collect cut grass or hay from the ground and transfer it to another position, a blower also mounted on the framework and adapted to deliver a blast of air to the cut grass or hay lying on the ground for causing it to be engaged by the conveyor, and means for driving the blower and conveyor.

2. A grass or hay lifter comprising in combination a framework, a conveyor provided with tines, a trough situated at the underside of the conveyor, the latter and the trough being mounted in inclined positions on the framework so that cut grass or hay from the ground can be moved by the conveyor tines along the trough to a discharge position, a blower also mounted on the framework and adapted to deliver a blast of air to the cut grass or hay lying on the ground for causing it to be engaged by the conveyor tines, and means for driving the blower and conveyor.

CHARLES GOODALL.